United States Patent Office 3,441,416
Patented Apr. 29, 1969

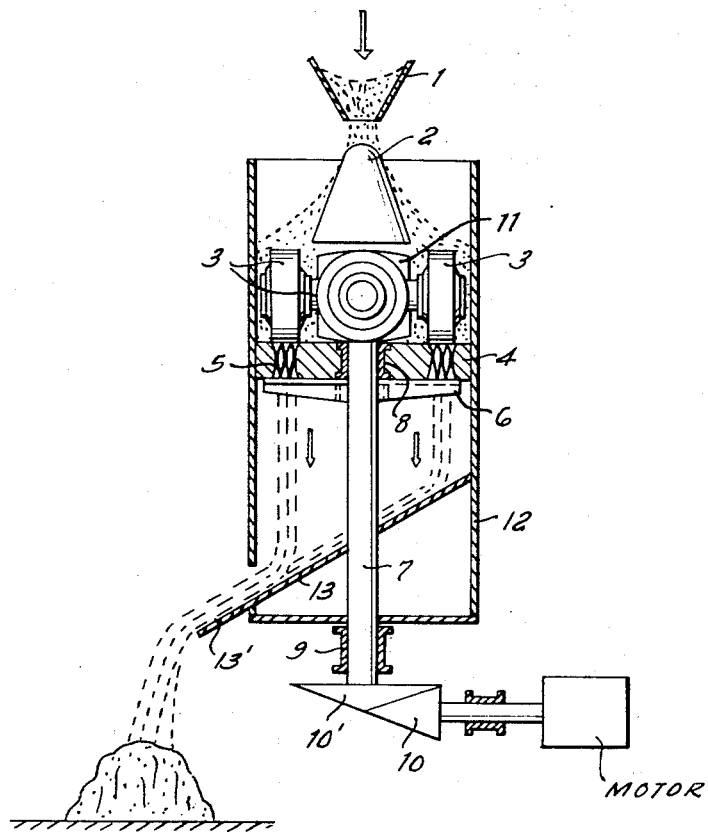

3,441,416
METHOD OF PELLETING HOPS AND THEN SOLVENT EXTRACTING
Wilhelm Depmer, 86 Kielmannseggstrasse,
2 Hamburg-Wandsbek-Marienthal, Germany
Filed Mar. 22, 1966, Ser. No. 538,160
Int. Cl. C12c 9/02
U.S. Cl. 99—50.5                     3 Claims

ABSTRACT OF THE DISCLOSURE

A method of processing hops includes conveying a mass of previously untreated hops to a compressing station, mechanically compressing the mass of hops, and simultaneously converting it into at least one rod, and thereupon subdividing the rod into individual sections or pellets of desired size which are subsequently subjected to solvent extraction.

---

The present invention relates to a method of treating hops and similar discrete materials. More specifically, the invention relates to a method of treating such materials to place them in better condition for further handling. Still more specifically, the present invention relates to a method of compacting the materials and thereafter granulating or pelletizing the compacted mass to improve the material for purposes of storage as well as when undergoing a solvent-extraction process. The invention also relates to an apparatus for carrying out the method.

It is well known that hops, a herbaceous material, is essential in the production of beer. Hops contains aromatic oil which, when extracted during the appropriate stage of the brewing process, imparts to beer the slightly bitter aftertaste characteristic of this beverage, as well as determining to a considerable extent the aroma of the beer. Furthermore, hops helps to conserve the beer and increases the ability of the beer to retain its "head," a characteristic which is particularly prized by many beer consumers.

Unfortunately the aromatic carrier, the so-called "hops-oil," changes readily—and thereby loses its valuable characteristics—under the influence of heat, light and humidity, all of which encourage the activities of micro-organisms and enzymes leading to such destruction of the aromatic oil. It has therefore been necessary heretofore to treat and store the hops under special conditions intended to inhibit such deleterious activities. Such conditions included compressing of the hops into large bales and storing of these bales in cool, dry and dark storage areas. This, however, was disadvantageous in many respects, since the bales required relatively large storage areas, had to be broken up again prior to use of the hops in the brewing process, and since the most desirable way of storing the hops, namely under a protective cover of inert gas, was made difficult if not impossible by the size of the storage areas required.

Furthermore, extraction of the aromatic substances from hops, either untreated or initially compressed into bales and subsequently broken up again, has never been very efficient and an improvement in this has long been considered highly desirable.

It is therefore a general object of the present invention to overcome the disadvantages outlined above with respect to what is known in the art.

A more specific object of the present invention is to provide a method of treating hops and similar discrete materials which will lead to conversion of the materials into a form in which they can be readily stored with a minimum requirement for storage space.

A still more specific object of the invention is to provide such a method which will make the hops less susceptible to deterioration of the aromatic substances contained therein than has been the case heretofore in the processes known from the prior art.

A further object of the invention is to provide a method of so treating the hops that the efficiency of removal of the aromatic substances during solvent extraction is considerably enhanced.

An additional object of the invention is to provide an apparatus for carrying out the above-mentioned method.

In accordance with one feature of the present invention I therefore provide a method of processing hops which comprises the steps of conveying a mass of hops to a compressing station, mechanically compressing the mass and simultaneously converting it into at least one rod, and thereupon subdividing this rod into individual sections of desired size.

An apparatus for carrying out this method comprises compressing means including die means which defines a plurality of passages, supply means for supplying to the die means the material to be treated, and compacting means for forcing the material through the passages of the die means whereby the material is compacted and simultaneously converted into a plurality of rods. The apparatus further comprises subdividing means for subdividing these rods into a plurality of individual sections of predetermined size.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the single figure is a partly sectioned, somewhat schematic side-elevational view of an apparatus for carrying out the method of the invention.

Discussing the drawing in detail, it will be seen that there is provided a hopper 1 into which the material to be treated, such as hops, is introduced in direction of the arrow. The lower end of the hopper 1 is open and arranged below the hopper is a conical or frustoconical body 2 whose base faces away from the hopper 1. Downwardly spaced from the base of body 2 there is provided a stationary die in form of a plate-member 4 having a central aperture therethrough and provided in its marginal portions with passages 5 whose cross-sectional area decreases in direction away from the body 2. A shaft 7 extends through the central aperture of plate member 4 and is journalled for rotation in the bearing 8—which latter may be incorporated in the central aperture of the plate member 4—and the bearing 9. One end of shaft 7 extends through the plate member 4 in direction towards the base of the body 2 and carries shafts or axles secured to or integral with the shaft 7, and extending transversely to the shaft 7 in such a manner that their respective axes are parallel to the upper surface of the plate member 4. In a preferred embodiment, as illustrated in the drawing, the upper end of shaft 7 carries a journal 11 in which the individual axles are journalled for rotation. Each of these axles in turn carries a roller 3 and in the drawing it is assumed that there are four such shafts, and consequently four such rollers 3. The rollers 3 are so positioned that they engage the upper surface of plate member 4 in the region of the passages 5 and roll along this surface in a circular path. It will now be seen that the hops, as it leaves the hopper 1 through the lower open end thereof, falls onto the body 2 which distributes it equally over the upper surface of plate member 4. As the hops falls onto the plate member 4 it is pressed into the passages 5 by the rotating rollers 3. Since the passages 5 converge in direction away from the upper surface of plate member 4, the hops is compressed in these apertures 5 and leaves them at the lower surface of plate member 4 in form of compacted rods.

Arranged below the lower surface of plate member 4 and, if desired, carried by the shaft 7 for rotation therewith, is a cutter 6 which subdivides the rods as the latter leave the passages 5 in downward direction, into a plurality of individual sections of predetermined length. These sections, which may be considered as grains or pellets, are allowed to fall onto an inclined surface 13 leading to an opening 13' in the lower portion of the housing 12 which surrounds the novel apparatus. Thus, the hops pellets or grains leave the housing 12 through the opening 13' and may be conveyed to a suitable collecting station which forms no part of the present invention.

Shaft 7 may be rotated by any suitable means which in the illustrated embodiment is assumed to be a motor whose drive shaft is connected with the shaft 7 via bevel gears 10, 10' so that the shaft 7 is thereby rotated.

Of course it will be understood that, although in the drawing the apparatus is shown arranged for vertical operation, it can also be arranged horizontally or be inclined in a desired manner.

The grains or pellets produced with an apparatus as set forth herein may vary in size, and dimensions of between 3 and 8 mm. have been found to be particularly suitable. They may be subjected to a percolation extraction process utilizing such solvents as Hexan, Trichlorethylene or Methylenechloride and it is to be noted as an advantage that the pellets or grains do not dissolve in many of the suitable organic solvents. On the other hand—and this constitutes an even more important advantage—they dissolve readily in water and can therefore be employed directly in the brewing process, that is in pellet-form and without the need for undergoing a separate extraction. The advantage of this in terms of economics and brewing simplification is obvious.

It will be understood that another one of the very considerable advantages of the method herein disclosed is the fact that compacting of the hops into grains or pellets decreases the access of light and moisture-carrying air to a minimum. Furthermore, the bulk density, that is the weight of material which can be accommodated per cubic meter is 500 to 600 kg. for the grains or pellets, versus 50 to 100 kg. for baled hops. This, of course, results in storage space savings ranging as high as a 10:1 ratio and, therefore, permits ensiling—that is storing of the pellets in a silo—of large quantities of the pellets under air-tight conditions, that is under a protective layer of inert gas. This latter was obviously not practical with the previously customary method of storing bales of hops where the storage space required was too large to make the use of inert gas practical.

Beyond all this, however, it has been found that the grains or pellets yield the miscella, that is the soluble substances, much more readily than has been the case heretofore with untreated or simply baled hops. The ratio of miscella to solvent, obtained when the pellets in accordance with the invention are subjected to solvent extraction, is approximately 1:1 whereas the ratio known from the prior art is approximately 1:8. Thus, a considerably better extraction and a much higher miscella concentration is achieved.

By way of example of a solvent extraction process, let it be assumed that hops not treated in accordance with the invention is to be solvent-extracted. In such case, the ratio of solvent required to treat a given quantity of hops is 1:15. The content of extractable material in the hops is 15%. The ratio of solvent adhering to the processed (i.e., extracted) hops is 1:8 which, assuming that 0.350 kg. hops is originally treated with 5.25 kg. solvent, means a quantity of 2.38 kg. solvent adhering to the extracted hops. The quantity of solvent effluing with the extract is 2.87 kg. and the miscella concentration is 1.8%. Thus, 5450 kg. of solvent must be evaporated from 100 kg. of extract, and 800 kg. of solvent must be recovered from every 100 kg. of extracted (i.e., processed) hops.

The advantage of the grains or pellets of the present invention will become fully apparent when this same example is assumed to be carried out with the pellets. The quantity of solvent being the same, but the volume ratio of pellets versus regular hops being 1:10 in favor of the pellets, the ratio of pellets to solvent is about 1:1.5, or 3.5 kg. of pellets to 5.25 kg. of solvent. The contents of extractable materials is the same in the pellets as in regular hops namely 15%. The ratio of extracted pellets to adhering solvent is 1:1, meaning that the extracted pellets carry with them 2.98 kg. of solvent, whereas the solvent effluing with the extract equals 2.27 kg. The miscella concentration is 18.8%, representing an increase of 17% over the example given above with respect to regular hops. Also unlike that example, the quantity of solvent to be evaporated from 100 kg. of extract in the present case amounts to a mere 432 kg. (versus 5450 kg. heretofore) and the solvent to be recovered from every 100 kg. of extracted pellets is 100 kg. (versus 800 kg. heretofore). These figures are so obviously and overwhelming in favor of the example utilizing the novel pellets that further elaboration is unnecessary.

It will be understood that each of the elements described above, or two or more together, may also find a useful application in other types of apparatus for and the method of treating hops and similar discrete materials differing from the types described above.

While the invention has been illustrated and described as embodied in methods of, and apparatus for treating hops and similar discrete materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of processing hops, comprising the steps of conveying a mass of hops to a compressing station; pelleting the hops at such compressing station to thereby protect the aromatic oils of the hops against deleterious influences; and subjecting the thus obtained pellets of hops to solvent extraction whereby to withdraw the aromatic oils from the hops pellets.

2. A method as defined in claim 1, further comprising storing the pellets in pelleted state prior to subjecting the pellets to solvent extraction.

3. A method as defined in claim 1, wherein the weight ratio of the pellets to the solvent during solvent extraction is substantially 1:1.5.

References Cited

UNITED STATES PATENTS 2,181,931   12/1939   Wood _____ 90—50.5
2,947,667   8/1960   Komm _____ 195—70

FOREIGN PATENTS 93,341   5/1962   Denmark.

A. LOUIS MONACELL, *Primary Examiner.*

NORMAN ROSKIN, *Assistant Examiner.*

U.S. Cl. X.R.

99—88, 92, 171, 278